Figure 1:
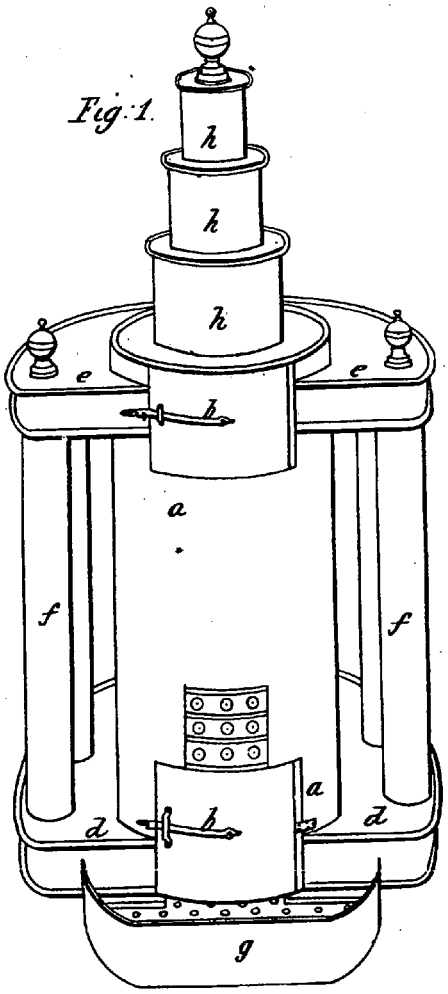
Figures 2, 3, 4:
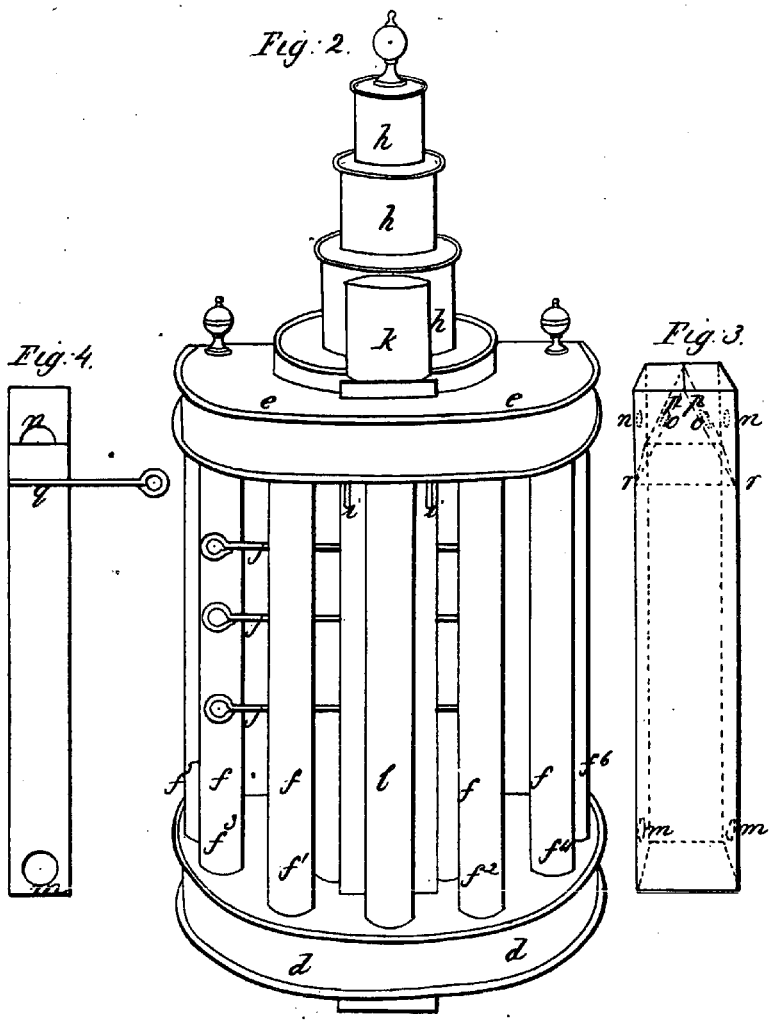
Figure 7:
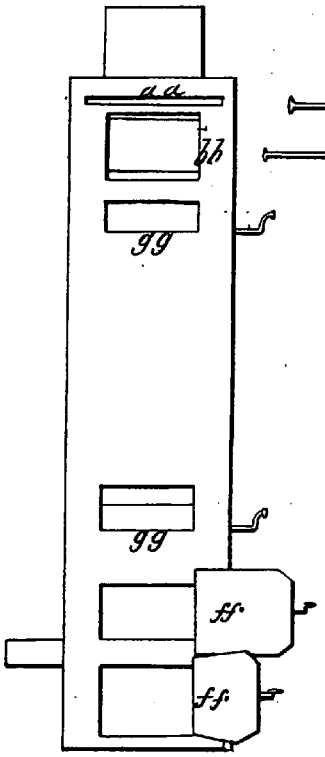
Figure 8:
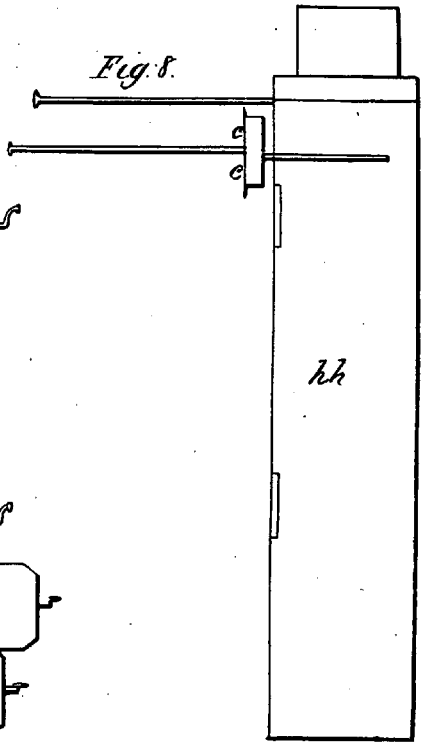
Figure 9:
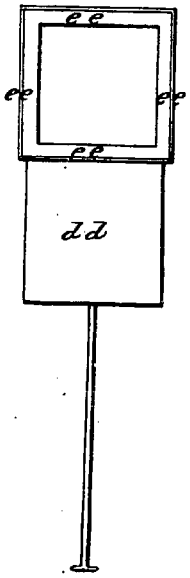

(12) United States Patent
Atwater

(10) Patent No.: X7726
(45) Date of Patent: Aug. 23, 1833

(54) STOVES, & GRATES OR FURNACE

(76) Inventor: James Atwater

James Atwater
Letters Patent

The Schedule referred to in these Letters Patent and making part of the same containing a description in the words of the said James Atwater himself of his improvement in the common furnace Stove.

To all people to whom these presents shall come. Know ye that I James Atwater of New Haven in the County of New Haven & State of Connecticut a Citizen of the United States have invented made & applied to use a new & usefull improvement in the common furnace Stove which I describe and specify as follows. In the top or head of the stove Fig I. a. at about one third of its height I insert two pipes b. c. at right angles to the head & projecting laterally outward from the centre thereof a short distance then I turn these two pipes perpendicularly downward parallel to the body of the Stove and continue each of them d. e. down to a base or drum f. g. standing on a level or nearly so with the bottom of the stove. then I insert in each of these bases a pipe Figure II. h. at right angles or nearly so projecting toward the rear of the stove horizontally a short distance & then these pipes figure III. i. j. are turned perpendicularly upward & continued to nearly the height of the head of the stove then these pipes are turned at right angles laterally & horizontally inward toward each k. l. & inserted in a pipe of a larger size round or square Figure III. m which passes toward the front horizontally till it reaches & is inserted in the head of the stove Figure II n. also in the rear of the stove below the grate & at as low a point above the dust pan Fig. I. Z. as is convenient. I insert a pipe Figure III. o projecting horizontally a short distance from the stove & then turning upward Figure III o, [illegible] parallel to the stove till it meets & is inserted in the same pipe Figure II m, in which the two last mentioned pipes terminates. All these pipes should be placed so near the stove as not to occupy too much space but may be regulated as to distance from the stove by convenience. The perpendicular pipes Figure + Drawing I. d, e, may be continued upward above their respective upper lateral
pipes if desired & terminated Figure I p, q, with some ornament corres-
ponding in height & appearance with the head of the stove as may please
the fancy of the maker or owner. In the head of the stove above the part
of the same whence the two first or two lower lateral pipes proceed & be-
low the place where the pipe which proceeds from the two second or up-
per lateral pipes enters the head, I place a valve Figure I. v. revolving
on a pin or swivel so that it may be turned & close up the draught or
open the same in to the head of the stove at pleasure. In each
of the two bent perpendicular pipes I place a similar valve s, t, which
closes or opens them at pleasure & is placed at any convenient height
from the bottom of the stove. In the pipe which is inserted near the bottom
of the stove or below the grate & proceeds upward in the rear of the stove
as already described. I place a similar valve Figure III. u, which op-
ens or closes this pipe at pleasure. In the pipe which enters the head
of the stove from the rear & in which the rear pipe & the two other lateral
pipes terminate as before described I place a pipe Figure I. z. (or two
pipes) which proceeds in any further direction to conduct off smoke
gas &c. All the pipes should be proportioned to the size of the stove in the
usual manner. The best material for the construction of the stove & pipes
is good sheet or cast iron & a lining of soap stone or fire brick with the
[illegible] the grate somewhat nearer together than those used in com-
mon grates. The doors & ash draw are made in the usual manner.
The doors may be ornamented with [illegible] when required. The ef-
fect sought to be gained by this combination & arrangement are to
economize & diffuse the heat &c. [illegible] the draught of the stove &
prevent the escape of dust when cleaning the same. These things are
done as follows. When the valve in the head of the stove Figure I. v. is
open & all the others Figure I. s. t. Figure III. u. are shut the stove
has the strong & direct draught of a simple furnace stove. When
the valve in the head of the stove Figure I. v. is closed & those in the
front side pipes Fig I. s, t, are open then the heated air passes from
the head into these last mentioned pipes down these & from into the drums & thence into the rear sidepipes & upward thro' them & finally into the pipe which leads off into the chimney or flue or some other part of the building. If one of the valves in the side pipes Figure I. s. t. is open & the other shut. the heated air will then be confined to the side on which the open valve is found. If the valve in the rear pipe Figure III. u. is open & all the others shut & also the lower doors Figure I. w. y. & pan z. leaving only the upper door open Figure I. y. then the draught is down ward thro' the fuel into the back pipe and upward thro' that pipe only & off as before. And if all the doors Figure I. w. y. y. are open & valves as last mentioned the only draught is still thro' the back pipe. Should the draught for carrying off the dust and causing the fire to burn downwards not be required, the last described or back pipe may then be omitted. If the improvement for the retention & diffusion of the heat should not be required then the side pipes may be omitted or one side pipe only with its valve be retained. When the stove is to be placed in a fire place some change in its structure will be required to fit it for that object. The head may be shortened as seen in Figure IV. & the valve placed in a pipe Figure IV. s, & closed or opened with a rod or handle Figure IV. b, coming to the front of the stove. The valve also in the back pipe Figure IV. c. will need to be opened and shut with a similar rod & both rods must be connected with the pivot of the valve by means of a knee or lever so that the rods will open or shut the valve by moving backward & forward. The valves in the side pipes Figure V must be placed as before described & as seen in Figure I. s. t. A slight change is also requisite in the communication of the side pipes with the pipe which leads from the stove and conducts away the smoke, gas &c. This change is seen in Figure IV. d. Figure V. exhibits a front view of such a fire place stove with its doors e, f, g, & pan h, This will be sufficiently understood without further description. The only object in exhibiting this form of the improvement is to show how the invention while it retains the whole principle which I claim can be accommodated to the place in which the instrument is to be used used. I claim as my improvement the arrangement, com bination,
adaptation & adjustment of the several pipes & valves herein before de-
scribed & specified so that by means thereof the draught of the stove
is at pleasure either upward & direct thro the fuel as in the common
furnace stove or upward thro the fuel & indirect & circuitous thro
a pipe or series of pipes near the body of the stove or downwards thro
the fuel & a rear pipe & in either case ultimately off in the usual
manner. I claim also the right to make use & vend stoves with
any two of said draughts in combination that is to say with said
upward & direct draught combined with the said upward & indirect
draught thro a side pipe or pipes as above described without the down-
ward draught aforesaid thro the fuel & passing off thro a rear pipe. And
also the said upward & direct draught in combination with the down-
ward draught thro the fuel & passing off thro the rear pipe as above de-
scribed & without the upward & indirect draught aforesaid thro the fuel
& the side pipe or pipes. And also the said upward & indirect draught
thro the fuel & a side pipe or pipes in combination with the downward
draught thro the fuel & passing off thro a rear pipe as above described
without the said upward & direct draught. And I claim no particu-
lar part of the instrument separately taken but only so much of the appar-
atus in combination as accomplishes the combination of the various draughts
(i.e.) either the combination of the whole of the three draughts or of any
two of the same. And I make a separate claim for each of the above
specified combinations. In testimony that the foregoing is a true, full,
& exact description of the construction & operation of said machine as
invented & improved by me. I have hereunto set my hand this
19th day of March AD. 1834

Witnesses [illegible] Samuel Atwater

[illegible] Critchfield [illegible]

[illegible] C. [illegible]

United States Patent

Patent No.: X7726

Sheet 1-3 Sheets.

J. Atwater.

Heating Stove.

Patented Aug. 23, 1833.

Sheet 2-3 Sheets.

J. Atwater.

Heating Stove.

Patented Aug. 23, 1833.

Sheet 3-3 Sheets.

J. Atwater.

Heating Stove.

Patented Aug. 23, 1833.